United States Patent [19]

Blaschek

[11] Patent Number: 4,892,404
[45] Date of Patent: Jan. 9, 1990

[54] FILM TRANSPORT MECHANISM FOR A MOTION PICTURE CAMERA

[75] Inventor: Otto Blaschek, Aschheim, Fed. Rep. of Germany

[73] Assignee: Arnold & Richter Cine Technik GmbH & Co. Betriebs KG, Munich, Fed. Rep. of Germany

[21] Appl. No.: 134,119

[22] Filed: Dec. 17, 1987

[30] Foreign Application Priority Data

Dec. 19, 1986 [DE] Fed. Rep. of Germany ....... 3643594

[51] Int. Cl.$^4$ .............................................. G03B 1/22
[52] U.S. Cl. .................................... 352/192; 352/193; 352/191; 226/62; 226/69
[58] Field of Search ............... 352/191, 192, 193, 187; 226/62, 69

[56] References Cited

U.S. PATENT DOCUMENTS

| 3,235,151 | 2/1966 | Adams | 226/71 |
| 3,587,960 | 6/1971 | Gerb | 226/62 |
| 3,759,433 | 9/1973 | Gerber | 226/54 |
| 4,402,581 | 9/1983 | Bauer | 352/192 |

FOREIGN PATENT DOCUMENTS

| 369902 | 2/1983 | Austria . | |
| 0272607 | 6/1988 | European Pat. Off. . | |
| 2342707 | 3/1975 | Fed. Rep. of Germany . | |
| 3111955 | 10/1982 | Fed. Rep. of Germany . | |
| 3643594 | 1/1988 | Fed. Rep. of Germany . | |
| 654421 | 2/1986 | Switzerland . | |
| 491067 | 8/1938 | United Kingdom | 352/192 |

Primary Examiner—Monroe H. Hayes
Attorney, Agent, or Firm—Spencer & Frank

[57] ABSTRACT

A film transporting mechanism includes two film transporting claws disposed on opposite sides of a center plane. The claws come into engagement with perforations in two rows of perforations in a film to be transported stepwise past a picture window. Each claw is driven by its own transporting drive. The tips of the claws traverse an elongate, closed curve which at one end enters into the film's traveling plane and at another end leaves the plane. Each of the transporting drives has at least one drive shaft that is mounted in axially spaced bearings mounted in openings in laterally spaced bearing plates. The bearings for the drive shaft, or drive shafts, are disposed on opposite sides of the center plane, in the opening of the bearing plates. Transporting drive elements that couple the claws to a drive shaft, or drive shafts, are disposed further from the center plane than the bearings in the bearing plates and, when worn, can be easily replaced since the drive elements are located outwardly from the bearing plates.

11 Claims, 4 Drawing Sheets

… (continued)

FILM TRANSPORT MECHANISM FOR A MOTION PICTURE CAMERA

CROSS REFERENCE TO RELATED APPLICATIONS

This application claims the priority of Application Ser. No. P 36 43 594.5 filed December 19th, 1986 in the Federal Republic of Germany, the subject matter of which is incorporated herein by reference.

BACKGROUND OF THE INVENTION

The invention relates to a film transporting mechanism for a motion picture camera equipped with transporting claws disposed on both sides of a center plane for engagement in two rows of perforations of a film to be transported in steps past a picture window, with each transporting claw being driven by its own transporting drive so that its tip or tips traverse an elongate, closed curve which at its end enters into the travelling plane of the film and leaves it again at the other end, and both transporting drives have at least one common shaft to drive them. Such a film transporting mechanism is disclosed, for example, in DE-OS 3,101,813. This or similar film transporting mechanisms have the drawback that the individual parts of the transporting drives for both sprocket elements are arranged between two bearing plates which serve to support the drive shaft or shafts. This configuration imposes limitations with respect to the structural configuration of individual elements of the transporting drives which can thus not be selected optimally for best possible wear resistance, balancing, quiet running and ease of maintenance. Regarding the possibilities of assembly and maintenance of the two transporting drives, one drawback is already that assembly and the possibly needed disassembly and subsequent re-assembly between the two bearing plates become difficult and time consuming.

SUMMARY OF THE INVENTION

It is the object of the invention to configure a film transporting mechanism of the above-mentioned type in such a manner that it can be assembled and maintained in a significantly more simple manner but offers, in addition, improved wear resistance, balancing and quiet running.

The invention solves the problem at hand primarily by bearings disposed closer to a center plane than transporting drives driving film transporting claws. Due to this configuration, the transporting drives for the two transporting sprocket elements are now no longer disposed between the bearings of the shafts serving to drive them but outside of these bearings and are therefore directly accessible. Due to the external arrangement, the cranks of the transporting drive may be provided with open crank pins having a small diameter which are also suitable for wear-resistant ball bearings. Further advantageous features defined in the dependent claims contribute to the solution of the problem at hand. An additional drive shaft, the main drive shaft, may here be provided around which the film transporting mechanism can be pivoted away from the travelling plane of the film to make the latter more easily accessible.

Finally, the invention also providing hinged transporting drives configured as ball bearings in a a film transporting mechanism whose transporting drive is a pure crank drive and is therefore particularly quiet running. This drive assembly can be realized particularly well by attaching it outside of the drive shaft bearings to the drive shaft so that the drive assembly is disposed outwardly from the bearing plate, but even by itself already embodies advantageous characteristics, e.g. excellent quiet movement.

BRIEF DESCRIPTION OF THE DRAWINGS

One embodiment of the invention will be described below with reference to the drawing figures. It is shown in FIG. 1, the principle of driving the film transporting mechanism.

DETAILED DESCRIPTION OF THE PREFERRED EMBODIMENT

Figure 1:
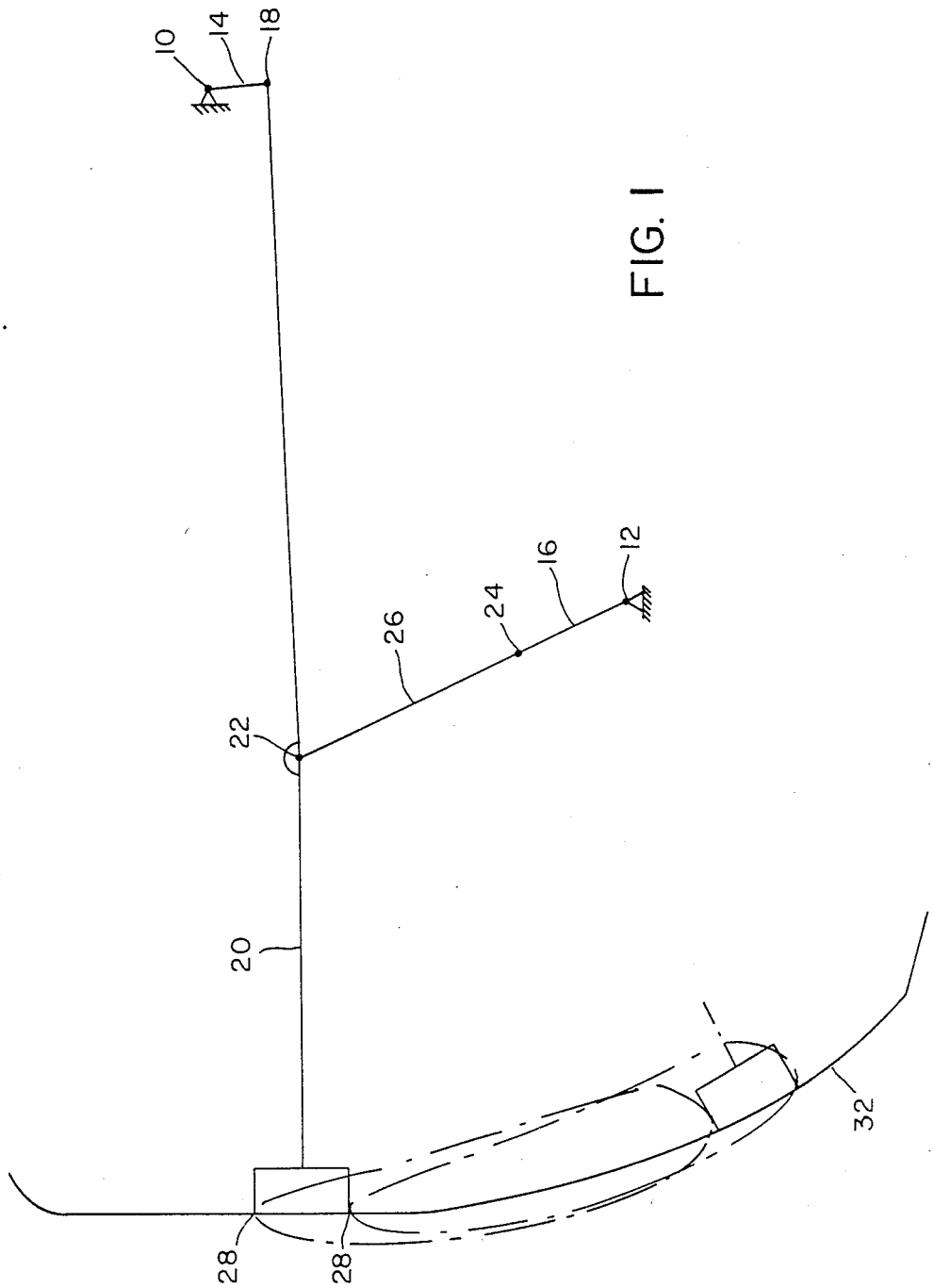
Figure 3:
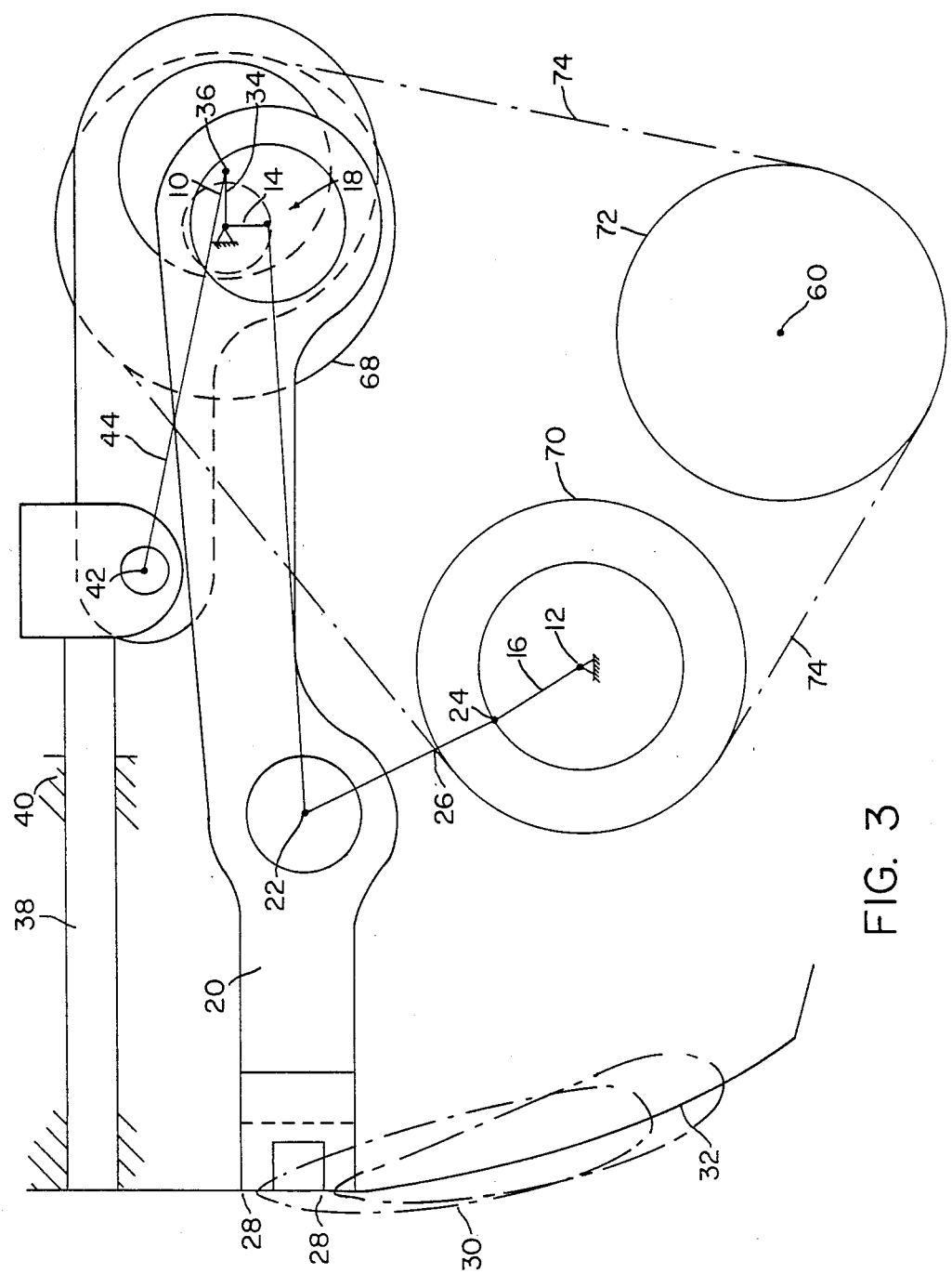
FIG. 3, a side view of significant components of the film transporting mechanism according to FIGS. 1 and 2.

FIG. 1 shows the basic principle of a transporting drive for the transporting claws. Two shafts 10 and 12 are provided. Shaft 10 is provided with a crank 14, shaft 12 with a crank 16. The end of crank 14 forms a hinge point 18 at which a transporting claw bracket 20 is articulated. In the center section of bracket 20, there is a hinge point 22. Between this hinge point and a hinge point 24 at the end of crank 16 there is disposed a guide member 26. Components 14 to 26 together form a transporting drive which can be driven by shafts 10 and 12. As will be described in detail below, shafts 10 and 12 are subjected to rotation in the same direction and at the same speed, so that transporting drive 14 to 26 is caused to move in such a manner that the tips 28 of the transporting claws describe an elongate, closed curve 30 which is shown in FIG. 3 and whose one end enters into the film travelling plane 32 while its other end exits from it. Tips 28 thus engage in perforations in the film and advance it in steps.

FIG. 3 shows a structural example of the components of the transporting drive shown in principle already in FIG. 1 and additionally a crank drive for a blocking claw. For this purpose, a further crank 34 is fastened to shaft 10 with its end forming a hinge point 36. A blocking claw 38, which is displaceable in its longitudinal direction in a guide 40 indicated only schematically in FIG. 3, also has a hinge point 42 at its rear end. Between the latter hinge point and hinge point 36 there is disposed a push rod 44, by means of which blocking claw 38 is displaceable in its longitudinal guide 40. The angular offset of cranks 14 and 34 on shaft 10 is selected so that blocking claw 38 is disposed in a known manner outside the film travelling plane 32 as long as transporting sprockets 28 continue to advance the film.

Figure 2:
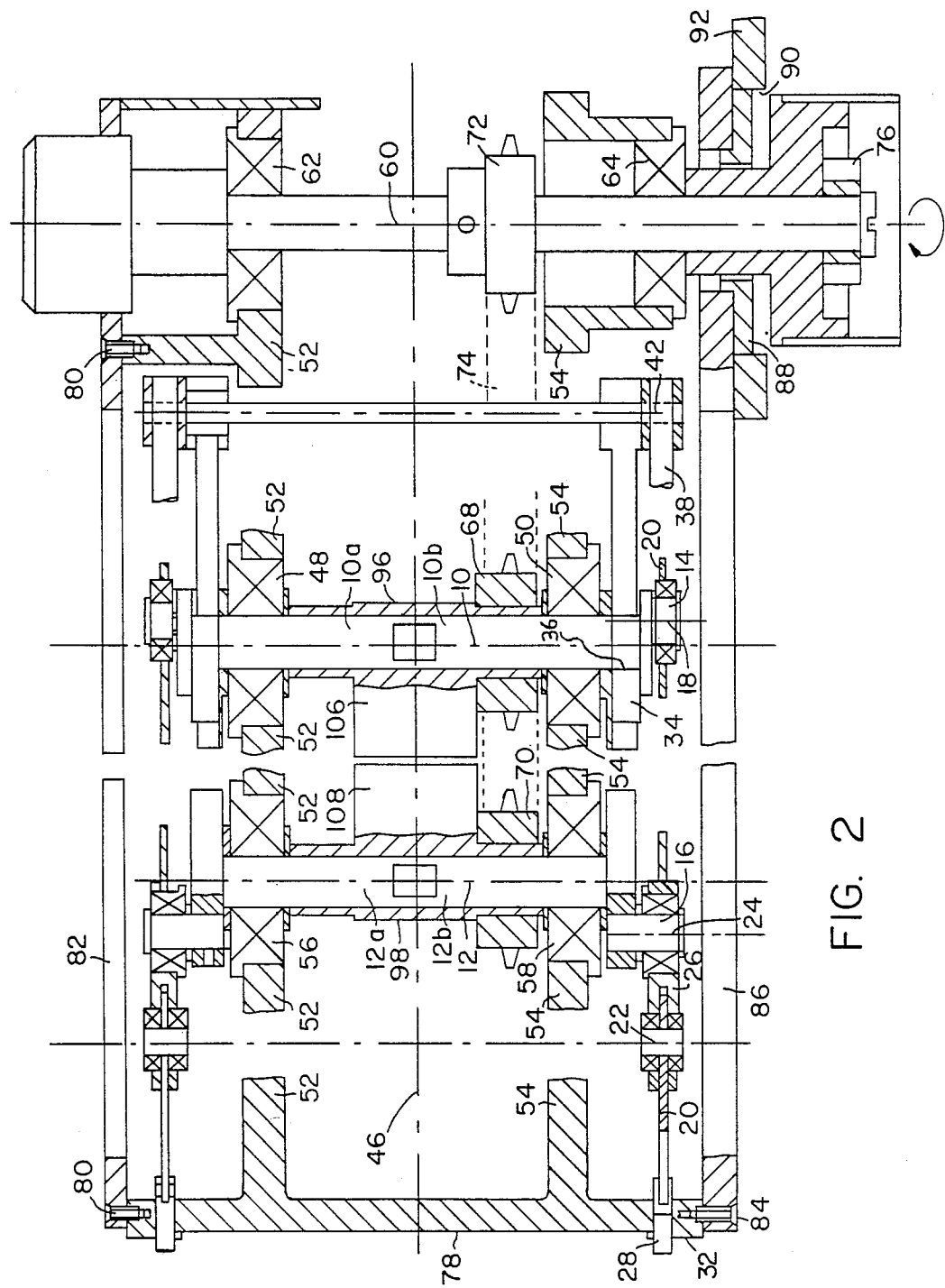
FIG. 2, a longitudinal sectional view of a structural embodiment of the film transporting mechanism of FIG. 1.

According to FIG. 2, transporting drive 14 to 26 for transporting sprockets 28 and crank drives 34 to 44 for blocking claw 28 are each provided twice. For the sake of simplicity, only one of the two transporting drives 14 to 26 and only one of crank drives 34 to 41 is given the same reference numerals as in FIGS. 1 and 3. The respective counterpart lies in a mirror symmetry arrangement with respect to the center plane 46 of the film transporting mechanism shown in FIG. 2. Shaft 10 is mounted in two ball bearings 48 and 50 which are each seated in the bores of a bearing plate 52 and 54. Shaft 12 is also mounted in two ball bearings 56 and 58 which are also seated in bores of bearing plates 52 and 54. Additionally, by way of ball bearings 62 and 64, a main drive shaft 60 is mounted in bearing plates 52 and 54. Due to their being mounted in bearing plates 52 and 54, shafts 10, 12 and 66 have a fixed spatial relationship to one another. Each one of shafts 10, 12 and 60 is provided with a toothed pulley 68, 70, 72, respectively, over which moves a perforated belt 74. Additionally, the main drive shaft 60 is provided with a coupling member 76, to which is coupled a motor (not shown). By way of the main drive shaft 60 and belt drive 68 to 74, the motor drives shafts 10 and 12 at the same speed and in the same sense of rotation to produce the above-described kinematic sequence.

Figure 4:
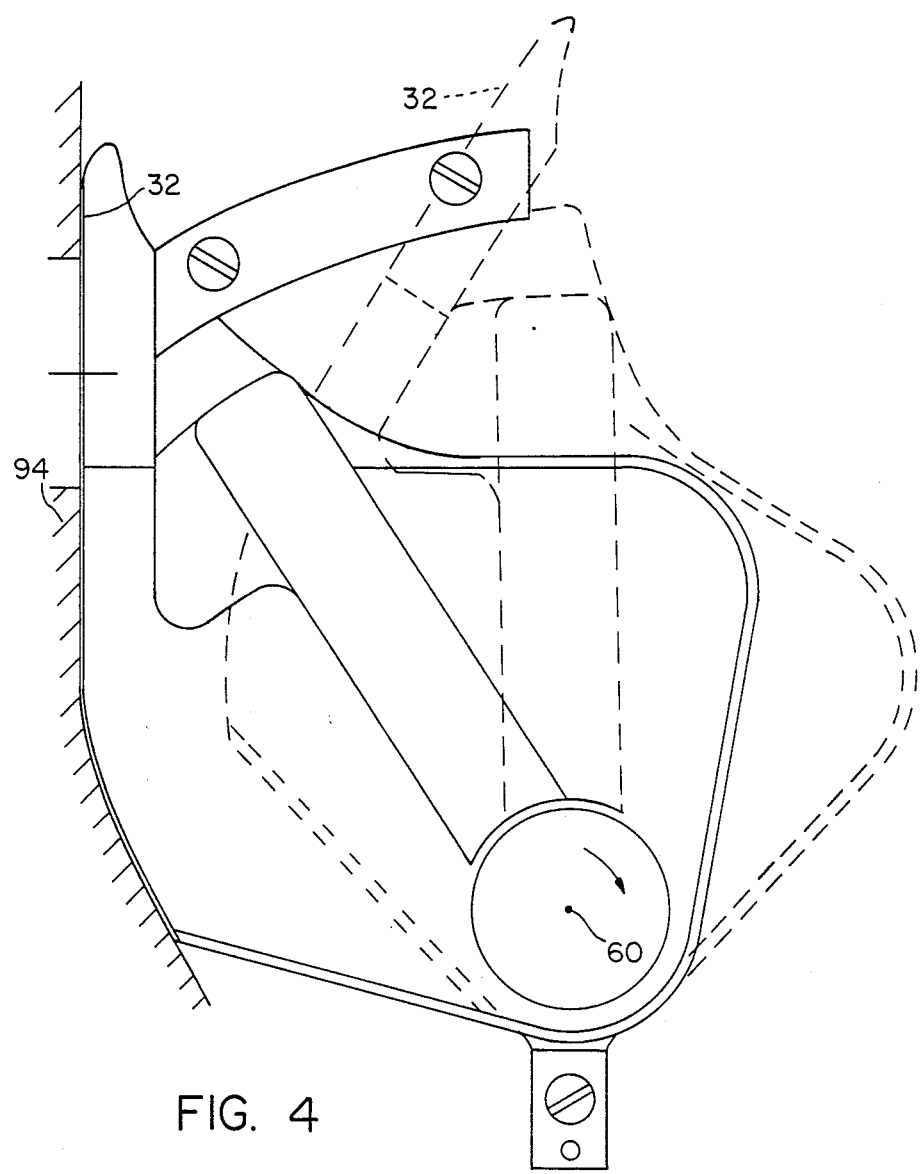
FIG. 4, various pivoted positions of the film transporting mechanism which is pivotal as a whole.

Bearing plates 52 and 54 are components of a rigid frame 78 at which film travelling plane 32 is also disposed. Frame 78 is rigidly fastened, by way of screws 80, to a cover plate 82 and by way of screws 84 to a pivot plate 86. Pivot plate 86 is fixed to a centering projection 88 which is accommodated in the centering bore 90 of a basic element 92 fixed to the camera in such a manner that it is able to rotate therein in the manner of a slide bearing. Centering projection 88 is disposed at a pivot plate 86 at the point where its axis is congruent with the axis of the main drive shaft 60. In this way, the latter constitutes the pivot axis for the entire film transporting mechanism which thus can be pivoted without engaging in drives 60 to 76. FIG. 4 shows the film transporting mechanism in its operational position at the film window 94 in solidly drawn outlines, yet in dashed lines in the position pivoted away from film window 94.

As indicated below, the assembly of the film transporting mechanism is very simple. For this purpose, shafts 10 and 12 are each composed of two shaft sections 10a, 10b and 12a, 12b, respectively. Together with their bearings, these shaft sections are inserted from the outside into the respective bores of bearing plates 52 and 54 and are pushed into coupling sleeves 96 and 98, respectively. Coupling sleeves 96 and 98 simultaneously serve as balancing masses 106, 108 and also support the above-mentioned pulleys 68, 70. On the thus mounted shafts 10 and 12, the components of the transporting drives 14 to 26 can be mounted to be easily accessible outside of bearing plates 52 and 54. At the same time, any possibly required maintenance will be simple due to the easy accessibility. After completed assembly of transporting drives 14 to 26, cover plate 82 and pivot plate 86 are attached and the centering projection 88 of the latter is inserted into the centering bore 90 of basic element 92 which is fixed to the camera.

I claim:

1. A film feed mechanism for a motion picture camera to advance film in a travelling plane, the film having first and second rows of perforations, comprising:

first and second feeding claws respectively having tips for engaging the perforations on the film, said first feeding claw being disposed on one side of a center plane for engagement with the first row of perforations of the film which is to be fed in steps past a picture window of the camera, and said second feeding claw being disposed on the other side of the center plane for engagement in the second row of perforations of the film;

first and second transporting drives for respectively driving said first and second feeding claws so that said tips traverse an elongate, closed curve which has an end which enters into the travelling plane of the film and has another end which leaves the travelling plane of the film, first and second drive shafts which are respectively in driving connection with said first and second transporting drives;

first and second bearings for mounting said first drive shaft, and third and fourth bearings for mounting said second drive shaft, said first and second bearings being mounted on each end of said first shaft, said third and fourth bearings being mounted on each end of said second drive shaft, said bearings for each of said first and second shafts being disposed closer to the center plane of the film feed mechanism than said first and second transporting drives.

2. A film feed mechanism to claim 1, further comprising first and second bearing plates respectively supporting said first and second bearings, said bearing plates being disposed on opposite sides of the center plane of the firm feed mechanism, said first and second bearing plates being disposed closer to the center plane than said first and second transportion drives.

3. A film feed mechanism to claim 2, further comprising a driving means connected between said first and second drive shafts to cause said first and second drive shafts to synchronously rotate, said driving means being disposed closer to the center plane than said bearings of said first and second drive shafts.

4. A film feed mechanism according to claim 3, wherein said driving means comprises a belt drive connected between a belt pulley, a belt, a third drive shaft, and a main drive shaft, said belt being driven by said third drive shaft, said main drive shaft having said first and second bearing plates which together are pivotable outwardly as a unit together with said first and second transporting drives for exposing the travelling plane of the film.

5. A film feed mechanism according to claim 4, further comprising balancing masses attached respectively to said first and second shafts between said first and second bearings, said balancing masses being arranged centrally relative to said first and second transporting drives.

6. A film feed mechanism according to claim 5, wherein each of said first and second feeding claws are each composed of two shaft sections, said first and second bearings of each of said drive shafts being insertable into an opening in the respective ones of said first and second bearing plates from the respective sides of the bearing plates that face away from said center plane.

7. A film feed mechanism according to claim 6, wherein said drive means further comprises coupling sleeves for coupling together said belt pulley of said belt drive.

8. A film feed mechanism according to claim 7, further comprising blocking claws for blocking travel of the film and crank drive means for driving each blocking claw, wherein each of said blocking claws and each of said crank claws are disposed outside the respective first and second bearing plates relative to the center plane.

9. A film feed mechanism according to claim 1, wherein said first and second bearings of said first and second transporting drives are ball bearings.

10. A film feed mechanism according to claim 1, wherein said first and second bearings of said first and second transporting drives are slide bearings.

11. A film feed mechanism for a motion picture camera to advance film in a travelling plane, the film having first and second rows of perforations, comprising:
- a feeding claw having tips;
- first and second synchronously rotating drive shafts driving said feeding claw in such a manner that the tips of said feeding claw traverse an elongate, closed curve which at one end enters the travelling plane of the film and at its other end leaves it again;
- a first crank driven by one of said first and second drive shafts;
- a bracket having one end hinged on said first crank, said feeding claw being connected to said bracket;
- a second crank which is driven by the other of said first and second shafts; and
- a guide member articulated to a center section of said bracket, said guide member being articulatedly connected with said second crank.

* * * * *